United States Patent
Guzman et al.

(10) Patent No.: US 10,558,880 B2
(45) Date of Patent: Feb. 11, 2020

(54) SYSTEM AND METHOD FOR FINDING EVIDENCING ELECTRONIC DOCUMENTS BASED ON UNSTRUCTURED DATA

(71) Applicant: Vatbox, Ltd., Herzeliya (IL)

(72) Inventors: Noam Guzman, Ramat Hasharon (IL); Isaac Saft, Kfar Neter (IL)

(73) Assignee: Vatbox, LTD., Herzeliya (IL)

( * ) Notice: Subject to any disclaimer, the term of this patent is extended or adjusted under 35 U.S.C. 154(b) by 0 days.

(21) Appl. No.: 15/782,905

(22) Filed: Oct. 13, 2017

(65) Prior Publication Data

US 2018/0101745 A1   Apr. 12, 2018

Related U.S. Application Data (63) Continuation-in-part of application No. 15/361,934, filed on Nov. 28, 2016.

(60) Provisional application No. 62/408,780, filed on Oct. 16, 2016, provisional application No. 62/260,553, filed on Nov. 29, 2015, provisional application No. 62/261,355, filed on Dec. 1, 2015.

(51) Int. Cl.
   *G06K 9/18*    (2006.01)
   *G06Q 10/10*   (2012.01)
   *G06K 9/00*    (2006.01)
   *G06Q 40/00*   (2012.01)

(52) U.S. Cl.
   CPC .......... *G06K 9/18* (2013.01); *G06K 9/00456* (2013.01); *G06Q 10/10* (2013.01); *G06Q 40/123* (2013.12)

(58) Field of Classification Search
   CPC combination set(s) only.
   See application file for complete search history.

(56) References Cited

U.S. PATENT DOCUMENTS

| | | |
|---|---|---|
| 5,606,609 A | 2/1997 | Houser et al. |
| 6,028,970 A | 2/2000 | DiPiazza et al. |
| 6,343,149 B1 | 1/2002 | Motoiwa |
| 6,546,373 B1 | 4/2003 | Cerra |
| 7,299,408 B1 | 11/2007 | Daconta et al. |

(Continued)

FOREIGN PATENT DOCUMENTS

| | | |
|---|---|---|
| EP | 456491 A2 | 11/1991 |
| JP | 2004280274 A | 10/2004 |

(Continued)

OTHER PUBLICATIONS

The International Search Report and the Written Opinion for PCT/US2017/045488, ISA/RU, Moscow, RU, dated Jan. 11, 2018.

(Continued)

*Primary Examiner* — Tsung Yin Tsai
(74) *Attorney, Agent, or Firm* — M&B IP Analysts, LLC (57) ABSTRACT

A system and method for finding evidencing electronic documents based on unstructured data. The method includes analyzing a first electronic document to determine at least one transaction parameter of a transaction, wherein the first electronic document includes at least partially unstructured data; creating a template for the transaction, wherein the template is a structured dataset including the determined at least one transaction parameter; generating, based on the created template, at least one query; and querying at least one data source for a second electronic document using the at least one query.

19 Claims, 4 Drawing Sheets

(56) References Cited

U.S. PATENT DOCUMENTS

| | | |
|---|---|---|
| 7,693,760 B1 | 4/2010 | Fiteni et al. |
| 7,827,079 B2 | 11/2010 | Feldman et al. |
| 8,046,288 B1 | 10/2011 | LeRoux et al. |
| 8,065,611 B1 | 11/2011 | Chan et al. |
| 8,200,642 B2 | 6/2012 | Maze |
| 8,228,299 B1 | 7/2012 | Maloney et al. |
| 8,386,394 B1 | 2/2013 | Nguyen et al. |
| 8,417,017 B1* | 4/2013 | Beutel .................. G06Q 20/042 |
| | | 382/135 |
| 8,438,089 B1 | 5/2013 | Wasserblat et al. |
| 8,447,111 B2 | 5/2013 | King et al. |
| 8,639,062 B2 | 1/2014 | Calman et al. |
| 8,798,354 B1 | 8/2014 | Bunzel et al. |
| 8,890,978 B1 | 11/2014 | Madhani et al. |
| 8,996,350 B1* | 3/2015 | Dub ...................... G06F 16/285 |
| | | 704/1 |
| 9,002,838 B2 | 4/2015 | Pitzo et al. |
| 9,141,607 B1 | 9/2015 | Lee et al. |
| 9,158,833 B2 | 10/2015 | Urbschat et al. |
| 9,824,270 B1 | 11/2017 | Mao |
| 2001/0049680 A1 | 12/2001 | Yanagimoto |
| 2002/0091671 A1 | 7/2002 | Prokoph |
| 2002/0138467 A1* | 9/2002 | Jacobson .............. G06F 16/951 |
| 2003/0088562 A1 | 5/2003 | Dillon et al. |
| 2003/0163778 A1 | 8/2003 | Shores et al. |
| 2003/0212617 A1 | 11/2003 | Stone et al. |
| 2004/0010451 A1 | 1/2004 | Romano et al. |
| 2004/0034554 A1 | 2/2004 | Shirley et al. |
| 2004/0181749 A1 | 9/2004 | Chellapilla et al. |
| 2004/0267620 A1 | 12/2004 | Feldman et al. |
| 2005/0165623 A1 | 7/2005 | Landi et al. |
| 2005/0273614 A1 | 12/2005 | Ahuja et al. |
| 2006/0004814 A1 | 1/2006 | Lawrence et al. |
| 2006/0219773 A1 | 10/2006 | Richardson |
| 2007/0050356 A1 | 3/2007 | Amadio |
| 2007/0168382 A1 | 7/2007 | Tillberg et al. |
| 2007/0237427 A1* | 10/2007 | Patel .................. G06K 9/00442 |
| | | 382/305 |
| 2007/0250416 A1 | 10/2007 | Beach et al. |
| 2008/0079979 A1 | 4/2008 | Holt et al. |
| 2008/0082374 A1 | 4/2008 | Kennis et al. |
| 2008/0126155 A1 | 5/2008 | Xu et al. |
| 2008/0183523 A1 | 7/2008 | Dikeman |
| 2008/0219543 A1 | 9/2008 | Csulits et al. |
| 2008/0229187 A1 | 9/2008 | Mahoney et al. |
| 2009/0063470 A1* | 3/2009 | Peled .................... G06F 17/278 |
| 2009/0112743 A1 | 4/2009 | Mullins et al. |
| 2009/0171958 A1 | 7/2009 | Anderson |
| 2009/0192978 A1 | 7/2009 | Hewett et al. |
| 2009/0228294 A1 | 9/2009 | Choi et al. |
| 2010/0070562 A1 | 3/2010 | Boyer et al. |
| 2010/0106544 A1 | 4/2010 | Frost et al. |
| 2010/0161616 A1* | 6/2010 | Mitchell ................. G06F 16/22 |
| | | 707/741 |
| 2010/0182631 A1* | 7/2010 | King ...................... G06F 17/243 |
| | | 358/1.15 |
| 2010/0211609 A1 | 8/2010 | Xiong et al. |
| 2010/0220929 A1 | 9/2010 | Misawa et al. |
| 2011/0016043 A1 | 1/2011 | Dornseif |
| 2011/0138175 A1 | 6/2011 | Clark et al. |
| 2011/0182500 A1 | 7/2011 | Esposito et al. |
| 2011/0255784 A1 | 10/2011 | Welling et al. |
| 2012/0027246 A1 | 2/2012 | Tifford et al. |
| 2012/0078768 A1 | 3/2012 | King et al. |
| 2012/0133989 A1 | 5/2012 | Glover |
| 2012/0221448 A1* | 8/2012 | Evans .................... G06Q 30/04 |
| | | 705/34 |
| 2013/0051671 A1 | 2/2013 | Barton |
| 2013/0179314 A1 | 7/2013 | Stoke et al. |
| 2013/0282725 A1 | 10/2013 | Rubinger |
| 2013/0291127 A1 | 10/2013 | Bergman et al. |
| 2014/0006234 A1 | 1/2014 | Geisau et al. |
| 2014/0067633 A1 | 3/2014 | Venkatasubramanian et al. |
| 2014/0079294 A1* | 3/2014 | Amtrup ............. G06K 9/00469 |
| | | 382/112 |
| 2014/0129400 A1 | 5/2014 | Armstrong et al. |
| 2014/0153830 A1* | 6/2014 | Amtrup ............. G06K 9/00442 |
| | | 382/190 |
| 2014/0207634 A1 | 7/2014 | Edmonds |
| 2014/0244458 A1 | 8/2014 | Saft et al. |
| 2014/0344576 A1 | 11/2014 | Johnson |
| 2015/0012339 A1 | 1/2015 | Onischuk |
| 2015/0019409 A1 | 1/2015 | Vagiri |
| 2015/0019586 A1 | 1/2015 | Raichelgauz et al. |
| 2015/0026556 A1 | 1/2015 | Stadermann et al. |
| 2015/0106247 A1 | 4/2015 | Saft et al. |
| 2015/0127534 A1 | 5/2015 | Bhambhani |
| 2015/0235301 A1 | 8/2015 | Brady et al. |
| 2015/0242832 A1 | 8/2015 | Corritori et al. |
| 2015/0248657 A1 | 9/2015 | Loock et al. |
| 2015/0302154 A1 | 10/2015 | Brooks |
| 2015/0324767 A1 | 11/2015 | Walsh et al. |
| 2015/0332283 A1 | 11/2015 | Witchey |
| 2015/0356174 A1 | 12/2015 | Narayana et al. |
| 2015/0356545 A1 | 12/2015 | Marcuccilli et al. |
| 2015/0363893 A1 | 12/2015 | Saft et al. |
| 2015/0378972 A1 | 12/2015 | Kapadia et al. |
| 2015/0379346 A1 | 12/2015 | Newcomer et al. |
| 2016/0042671 A1 | 2/2016 | Barrett et al. |
| 2017/0147540 A1 | 5/2017 | McCormick et al. |
| 2017/0308517 A1 | 10/2017 | Josifovski et al. |
| 2017/0351968 A1 | 12/2017 | Bowers et al. |
| 2018/0012268 A1 | 1/2018 | Simantov et al. |
| 2019/0236128 A1 | 8/2019 | Guzman et al. |
| 2019/0236347 A1 | 8/2019 | Guzman et al. |
| 2019/0244048 A1 | 8/2019 | Saft et al. |

FOREIGN PATENT DOCUMENTS

| | | |
|---|---|---|
| JP | 2008167009 A | 7/2008 |
| JP | 2009157592 A | 7/2009 |
| JP | 2013016097 A | 1/2013 |
| WO | 2010143001 A1 | 12/2010 |
| WO | 2013048790 A1 | 4/2013 |
| WO | 2014132256 A1 | 9/2014 |
| WO | 2016115207 A1 | 7/2016 |

OTHER PUBLICATIONS

The International Search Report and the Written Opinion for PCT/US2017/055135, ISA/RU, Moscow, RU, dated Jan. 25, 2018.
The International Search Report and the Written Opinion of PCT/US2017/045333, ISA/RU, Moscow, Russia, dated Dec. 28, 2017.
The International Search Report and the Written Opinion of PCT/US2017/045497, ISA/RU, Moscow, Russia, dated Dec. 14, 2017.
The International Search Report and the Written Opinion of the International Searching Authority for PCT/US2017/032854, ISA/RU, Moscow, Russia, dated Oct. 12, 2017.
The International Search Report and the Written Opinion of the International Searching Authority for PCT/US2017/032855, ISA/RU, Moscow, Russia, dated Oct. 19, 2017.
The International Search Report and the Written Opinion of the International Searching Authority for PCT/US2017/033106, ISA/RU, Moscow, Russia, dated Oct. 12, 2017.
The International Search Report and the Written Opinion of the International Searching Authority for PCT/US2017/033338, ISA/RU, Moscow, Russia, dated Oct. 26, 2017.
The International Search Report and the Written Opinion of the International Searching Authority for PCT/US2017/043644 ISA/RU, Moscow, Russia, dated Dec. 28, 2017.
The International Search Report and the Written Opinion of the International Searching Authority for PCT/US2017/045338, ISA/RU, Moscow, Russia, dated Dec. 28, 2017.
The International Search Report and the Written Opinion of the International Searching Authority for PCT/US2017/045342, ISA/RU, Moscow, Russia, dated Dec. 28, 2017.
The International Search Report and the Written Opinion of the International Searching Authority for PCT/US2017/045491, ISA/RU, Moscow, Russia, dated Dec. 28, 2017.

(56) References Cited

OTHER PUBLICATIONS

The International Search Report and the Written Opinion of the International Searching Authority for PCT/US2017/045554, ISA/RU, Moscow, Russia, dated Dec. 28, 2017.
The International Search Report and the Written Opinion of the International Searching Authority for PCT/US2017/046317, ISA/RU, Moscow, Russia, dated Dec. 28, 2017.
The International Search Report and the Written Opinion of the International Searching Authority for PCT/US2017/056448, ISA/RU, Moscow, Russia, dated Jan. 25, 2018.
A Non-Final Office Action for U.S. Appl. No. 15/013,284, dated Apr. 4, 2017.
The International Search Report and the Written Opinion for PCT/US2016/016104, ISA/RU, Moscow, Russia, dated Apr. 14, 2016.
The International Search Report and the Written Opinion for PCT/US2016/063828, ISA/RU, Moscow, Russia, dated Apr. 13, 2017.
The International Search Report and the Written Opinion for PCT/US2016/066845, ISA/RU, Moscow, Russia, dated May 25, 2017.
The International Search Report and the Written Opinion for PCT/US2016/068536, ISA/RU, Moscow, Russia, dated Apr. 13, 2017.
The International Search Report and the Written Opinion for PCT/US2016/068714, ISA/RU, Moscow, Russia, dated May 11, 2017.
The International Search Report and the Written Opinion for PCT/US2017/012120, ISA/RU, Moscow, Russia, dated May 18, 2017.
The International Search Report and the Written Opinion for PCT/US2017/014874, ISA/RU, Moscow, Russia, dated May 18, 2017.
The International Search Report and the Written Opinion for PCT/US2017/015087, ISA/RU, Moscow, Russia, dated Jan. 26, 2017.
The International Search Report and the Written Opinion of the International Searching Authority for PCT/US2016/067716, ISA/RU, Moscow, Russia, dated Jul. 20, 2017.
The European Search Report for European Application No. 16890887.9, dated Jun. 5, 2019, EPO, Munich, Germany.
The European Search Report for EP Application 17767105.4, dated Sep. 9, 2019, EPO, Munich, Germany.
The European Search Report for EP Application No. 16894794.3, The European Patent Office, The Hague, Date of Completion: Aug. 16, 2019.
The European Search Report for 16869348.9 dated Apr. 2, 2019, EPO, Munich, Germany.
The International Search Report and the Written Opinion for PCT/US2017/064191, dated Feb. 28, 2018, ISA/RU, Moscow, Russia.
The European Search Report for European Application No. 17799796.2, dated Oct. 7, 2019, EPO, Munich, Germany.
The First Office Action for Japanese Patent Application No. 2016-574128, dated Oct. 8, 2019, Japanese Patent Office, Tokyo, Japan.

\* cited by examiner

SYSTEM AND METHOD FOR FINDING EVIDENCING ELECTRONIC DOCUMENTS BASED ON UNSTRUCTURED DATA

CROSS-REFERENCE TO RELATED APPLICATIONS

This application claims the benefit of U.S. Provisional Application No. 62/408,780 filed on Oct. 16, 2016. This application is also a continuation-in-part of U.S. patent application Ser. No. 15/361,934 filed on Nov. 28, 2016, now pending, which claims the benefit of U.S. Provisional Application No. 62/260,553 filed on Nov. 29, 2015, and of U.S. Provisional Application No. 62/261,355 filed on Dec. 1, 2015. The contents of the above-referenced applications are hereby incorporated by reference.

TECHNICAL FIELD

The present disclosure relates generally to searching for electronic documents, and more specifically to searching based on unstructured data in electronic documents.

BACKGROUND

Enterprise resource planning (ERP) is a business management software typically used to collect, store, manage, and interpret data from various business activities such as, for example, expenses made by employees of an enterprise. ERP systems generally collect data related to business activities of various departments in an enterprise. Such collected data may come from different data sources, and may be in different formats. ERP systems provide an integrated view of this business activity data, and further enable generation of expense reports that can later be sent to the relevant tax authority.

Especially in large enterprises, employees engage in a high number of business activities. Such business activities may further result in a large number of business expenses to be reported to tax authorities. Reporting such business expenses may result in tax breaks and refunds. To this end, employees typically provide receipts based on expenses incurred and are usually required to indicate the types of such expenses. Based on the indication, an ERP system may generate a report which is provided with any received receipts to the relevant tax authority.

Additionally, pursuant to managing the data related to business activities, ERP systems must associate and track relations between sets of the managed data. For example, information related to tax reporting of a receipt must be maintained with an association to the receipt itself. Any errors in associations between data sets can result in incorrect reporting, which in turn may cause loss of profits due to unsuccessful redemptions and exemptions, and failure to comply with laws and regulations. Thus, accurate data management is crucial for ERP systems.

Tracking such data presents additional challenges when portions of the data are unstructured. For example, there are further difficulties associated with tracking expense receipts stored as image files. Some existing solutions to these challenges involve identifying contents of files containing unstructured data based on file extension names provided by users. Such solutions are subject to human error (e.g., typos, mistaking contents of files, etc.), and may not fully describe the contents therein. These disadvantages may further contribute to inaccuracies in ERP systems.

The number of receipts obtained by employees in the course of business may be tremendous. This high number of receipts results in significant increases in data provided to ERP systems, thereby leading to difficulties managing the data in such ERP systems. Specifically, existing solutions face challenges in finding and maintaining correct associations within the managed data. These difficulties may result in errors and mismatches. When the errors and mismatches are not caught in time, the result may be false, related to a plurality of evidences or otherwise incorrect reporting. Manually verifying that reports match receipts is time and labor intensive, and is subject to human error. Further, such manual verification does not, on its own, correct issues with the managed data.

Additionally, existing solutions for automatically verifying transactions face challenges in utilizing electronic documents containing at least partially unstructured data. Specifically, such solutions may be capable of recognizing transaction data in scanned receipts and other unstructured data, but may be inefficient and inaccurate when utilizing the recognized transaction data.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for finding evidencing electronic documents based on unstructured data. The method comprises: analyzing a first electronic document to determine at least one transaction parameter of a transaction, wherein the first electronic document includes at least partially unstructured data; creating a template for the transaction, wherein the template is a structured dataset including the determined at least one transaction parameter; generating, based on the created template, at least one query; and querying at least one data source for a second electronic document using the at least one query.

Certain embodiments disclosed herein also include a non-transitory computer readable medium having stored thereon causing a processing circuitry to execute a process, the process comprising: analyzing a first electronic document to determine at least one transaction parameter of a transaction, wherein the first electronic document includes at least partially unstructured data; creating a template for the transaction, wherein the template is a structured dataset including the determined at least one transaction parameter; generating, based on the created template, at least one query; and querying at least one data source for a second electronic document using the at least one query.

Certain embodiments disclosed herein also include a system for finding evidencing electronic documents based on unstructured data. The system comprises: a processing circuitry; and a memory, the memory containing instructions that, when executed by the processing circuitry, configure the system to: analyze a first electronic document to determine at least one transaction parameter of a transaction, wherein the first electronic document includes at least partially unstructured data; create a template for the transaction, wherein the template is a structured dataset including the determined at least one transaction parameter; generate, based on the created template, at least one query; and query at least one data source for a second electronic document using the at least one query.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method for finding evidencing electronic documents based on unstructured data. A template is created for a first reporting electronic document. The reporting electronic document includes at least partially unstructured data indicating transaction parameters for a transaction. The template is created based on key fields and values identified in the reporting electronic document. A query is generated based on the created template. The query may be customized based on a type of the reporting electronic document, data sources to be searched, and the like. Using the query, one or more data sources is searched for a matching evidencing electronic document. Results of the search may be validated based on the template. Based on the template and the result evidencing electronic document, a reclaim electronic document may be generated.

In order to reclaim VAT or other payments for purchases made on the regular course of business by an enterprise, reclaim procedures are required. Such procedures require certain documents preparation and filings, evidences collection, and the like. The requirements vary from one jurisdiction to another depending on a type of enterprise, its origin, location of purchase, and more. These days, enterprises often manage their data in several sources, thereby making the task of identifying the required evidences complicated. Furthermore, such evidences may include sensitive data which should not be shared unless required for reclaiming. In other cases, there may be certain data that cannot be sent out due to regulatory matters, such as, for example, privacy issues.

The disclosed embodiments allow for finding and retrieving appropriate evidences based on transactions indicated in unstructured documents such as image or text files. More specifically, unstructured data in reporting electronic documents is analyzed to create a structured dataset template, which in turn may be utilized to generate queries that uniquely identify the respective transactions based on the structures of the templates, thereby allowing for efficient and accurate searching of data sources for appropriate evidencing electronic documents. Further, the created templates may be stored in place of the corresponding reporting electronic documents for more efficient subsequent use, as structured data can be processed more efficiently than unstructured data, semi-structured data, or data otherwise lacking a known structure.

Figure 1:
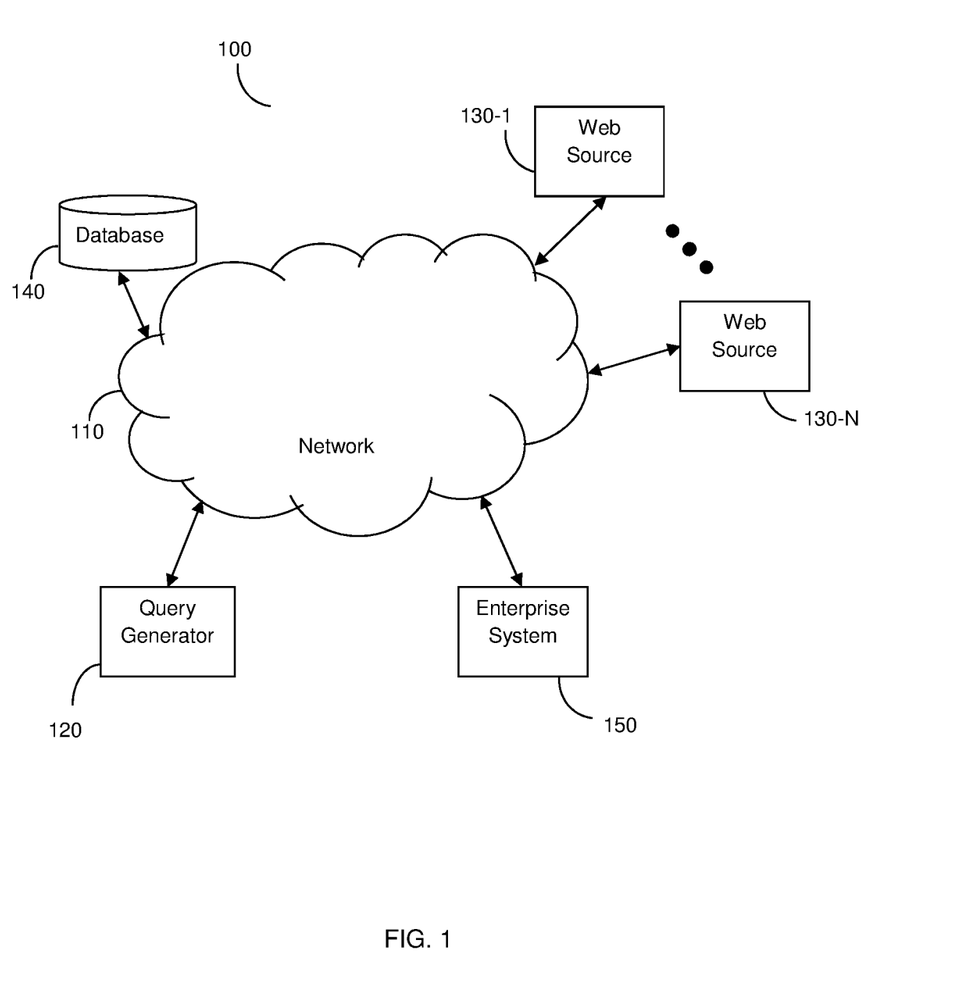
FIG. 1 is a network diagram utilized to describe the various disclosed embodiments.

FIG. 1 shows an example network diagram 100 utilized to describe the various disclosed embodiments. The network diagram 100 includes a query generator 120, web sources 130-1 through 130-N (hereinafter referred to individually as a web source 130 and collectively as web sources 130, merely for simplicity purposes), a database 140, and an enterprise system 150 communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The enterprise system 150 is associated with an enterprise, and may store data related to transactions made by the enterprise or representatives of the enterprise. The enterprise may be, but is not limited to, a business whose employees may purchase goods and services on behalf of the business. The enterprise system 130 may be, but is not limited to, a server, a database, an enterprise resource planning system, a customer relationship management system, a user device, or any other system storing relevant data. The user device may be, but is not limited to, a personal computer, a laptop, a tablet computer, a smartphone, a wearable computing device, or any other device capable of capturing, storing, and sending unstructured data sets. As a non-limiting example, the enterprise system 150 may be a smart phone including a camera. The enterprise system 150 may be utilized by, for example, an employee of an organization associated with the enterprise system 130.

The database 140 may store at least reporting electronic documents. In an example implementation, the database 140 may be operated by or otherwise associated with the enterprise associated with the enterprise system 150.

The web sources 130 store evidencing electronic documents such as, but not limited to, scans of receipts, invoices, and the like. The web sources 130 may be queried, and different web sources 130 may accept queries in different formats. To this end, the evidencing electronic documents stored in the web sources 130 may include or be associated with metadata identifying transactions evidenced by the respective evidencing electronic documents.

Figure 4:
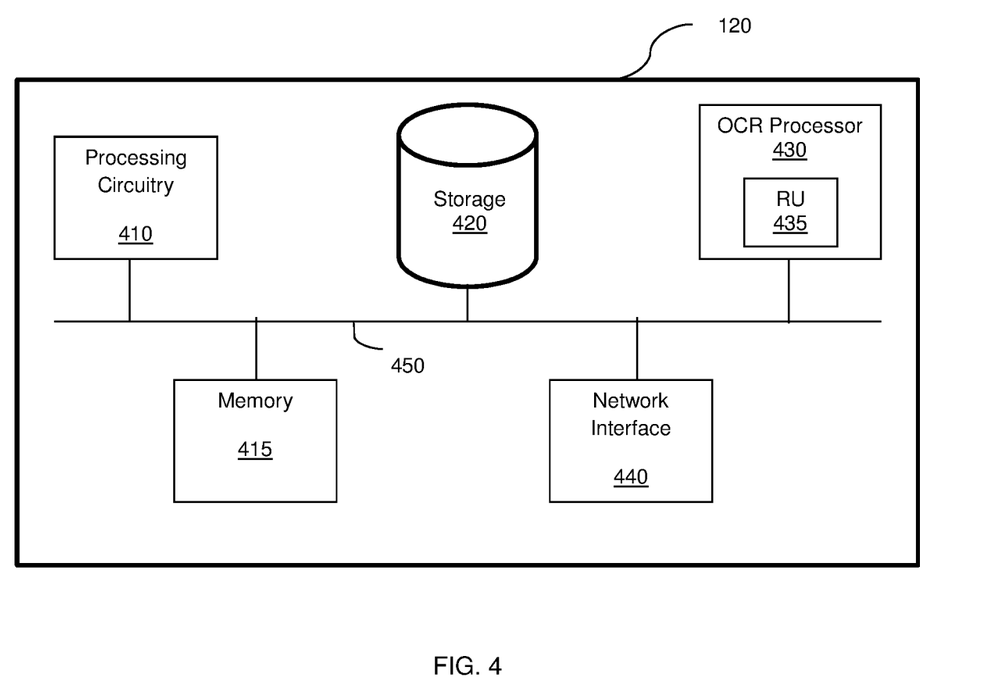
FIG. 4 is a block diagram of a query generator according to an embodiment.

In an embodiment, the query generator 120 includes an optical recognition processor (e.g., the optical recognition processor 430, FIG. 4). The optical recognition processor is configured to identify at least characters in data and, in particular, unstructured data. The query generator 120 is configured to receive a request from the enterprise system 130. The request may include, but is not limited to, a reporting electronic document, an identifier of the reporting electronic document, a location of the reporting electronic document in the database 140, and the like. The reporting electronic document is an at least partially unstructured electronic document including, but not limited to, unstructured data, semi-structured data, structured data lacking a known format (i.e., a format recognized by the query generator 120), or a combination thereof.

The reporting electronic document is typically, but is not limited to, an electronic document that may be, for example, manually filled in by an employee (by, e.g., typing or otherwise inputting information). In an example implementation, the reporting electronic document may be an image showing an expense report, or a text file including text of an expense report. The reporting electronic document indicates information related to one or more transactions.

The reporting electronic document may be uploaded to the database 140 by, e.g., a user of the enterprise system 150. For example, a user of the enterprise system 150 may take a picture of an expense report via a camera (not shown) of the enterprise system 150 and store the image in the database 140 (e.g., via a server of the enterprise, not shown).

In an embodiment, the query generator 120 is configured to analyze the at least partially unstructured reporting electronic document. The analysis may include, but is not limited to, recognizing elements shown in the at least partially unstructured electronic document via computer vision techniques and creating templates of transaction attributes based on the recognized elements. Such computer vision techniques may further include image recognition, pattern recognition, signal processing, character recognition, and the like.

Each created template is a structured dataset including the identified transaction parameters for a transaction. Specifically, the template includes one or more fields representing categories of transaction data, with each field including values of appropriate transaction parameters. Creation of structured dataset templates is described further herein below.

In an embodiment, based on the created templates, the query generator 120 is configured to generate a query for each transaction indicated in the at least partially unstructured reporting electronic document. Each query may be generated based further on query formats accepted by the web sources 130, a type of evidencing electronic document needed for evidencing the reporting electronic document, or both.

In an embodiment, the query generator 120 may be configured to determine a required type of evidencing electronic document for each transaction indicated in the reporting electronic document based on the created templates. The required types of evidencing electronic documents may be determined based on transaction parameters such as, but not limited to, price, type of good or service purchased, a type of reclaim requiring the evidencing electronic document (e.g., when the evidencing electronic document is to be utilized as evidence for a value-added tax reclaim), one or more evidencing rules for a country in which the transaction occurred, a combination thereof, and the like. As a non-limiting example, a less detailed invoice may be required for transactions having a price less than 250 Euros, while a more detailed invoice may be required for other transactions. As another non-limiting example, a VAT invoice may be specifically required for transactions in a first country, while any type of invoice may be required for transactions in a second country.

Each query may be based on values included in one or more fields of the respective template. The fields of the template based on which queries are generated may be predetermined fields selected to represent information of the transaction that uniquely identifies the transaction such that an evidencing electronic document (e.g., a receipt) found using the query provides evidence of the transaction. As a non-limiting example, for a purchase activity resulting in incurring an expense, the metadata may include a location in which the expense was incurred (indicated in a "location" field), characteristics (e.g., type of business, types of products sold, etc.) of the place of business in which the expense was made (e.g., as indicated in a "business info" field), a time at which the expense was incurred (e.g., as indicated in a "time" field), an amount (e.g., a monetary value or quantity indicated in a corresponding field), combinations thereof, and the like.

In an embodiment, the query generator 120 is configured to search for evidencing electronic documents using the generated queries. The result evidencing electronic documents may be associated with metadata matching the queries. The search may include querying one or more of the web sources 130 using the generated queries. In some implementations, the search may include querying the database 140 for result evidencing electronic documents, and only querying the web sources 130 for evidencing electronic documents of transactions not found during the search of the database 140. Thus, in such an implementation, the web sources 130 may only be queried for missing evidencing electronic documents.

In an optional embodiment, the query generator 120 may be configured to clean the results of the search. The cleaning may include, but is not limited to, removing private data, irrelevant data, or both, from the result evidencing electronic documents. The private data and irrelevant data may be determined based on one or more cleaning rules, which may be provided by the enterprise system 150. As a non-limiting example, private and irrelevant data may include personal information of a particular employee (e.g., personal credit card information, social security number, etc.) that is not needed for providing evidence supporting a VAT reclaim. In a further embodiment, the cleaning may include using optical character recognition on the result electronic documents and identifying, based on the results of the optical character recognition, the private and irrelevant data.

Using structured templates for finding evidencing electronic documents allows for more efficient and accurate searching than, for example, by utilizing unstructured data directly. Specifically, metadata generated based on the templates may be generated with respect to particular fields such that the metadata more efficiently and more accurately demonstrates parameters that uniquely identify the transaction. Accordingly, the metadata may be used to accurately search for matching evidencing electronic documents while reducing processing power and time related to comparing metadata.

The query generator 120 typically includes a processing circuitry (e.g., the processing circuitry 410, FIG. 4) coupled to a memory (e.g., the memory 415, FIG. 4). The processing circuitry may comprise or be a component of a processor (not shown) or an array of processors coupled to the memory. The memory contains instructions that can be executed by the processing circuitry. The instructions, when executed by the processing circuitry, configure the processing circuitry to perform the various functions described herein.

It should be understood that the embodiments disclosed herein are not limited to the specific architecture illustrated in FIG. 1, and that other architectures may be equally used without departing from the scope of the disclosed embodiments. Specifically, the query generator 120 may reside in a cloud computing platform, a datacenter, and the like. Moreover, in some implementations, there may be a plurality of query generators operating as described hereinabove and configured to either have one as a standby, to share the load between them, or to split the functions between them.

It should also be noted that some of the embodiments discussed with respect to FIG. 1 are described as interacting with only one enterprise system 150 merely for simplicity purposes and without limitations on the disclosure. Data from additional enterprise systems may be utilized to generate queries by the query generator 120 without departing from the scope of the disclosed embodiments. Additionally, the database 140 may equally be another data source such as, for example a server having access to one or more databases. Further, multiple databases may be utilized without departing from the scope of the disclosure.

Figure 2:
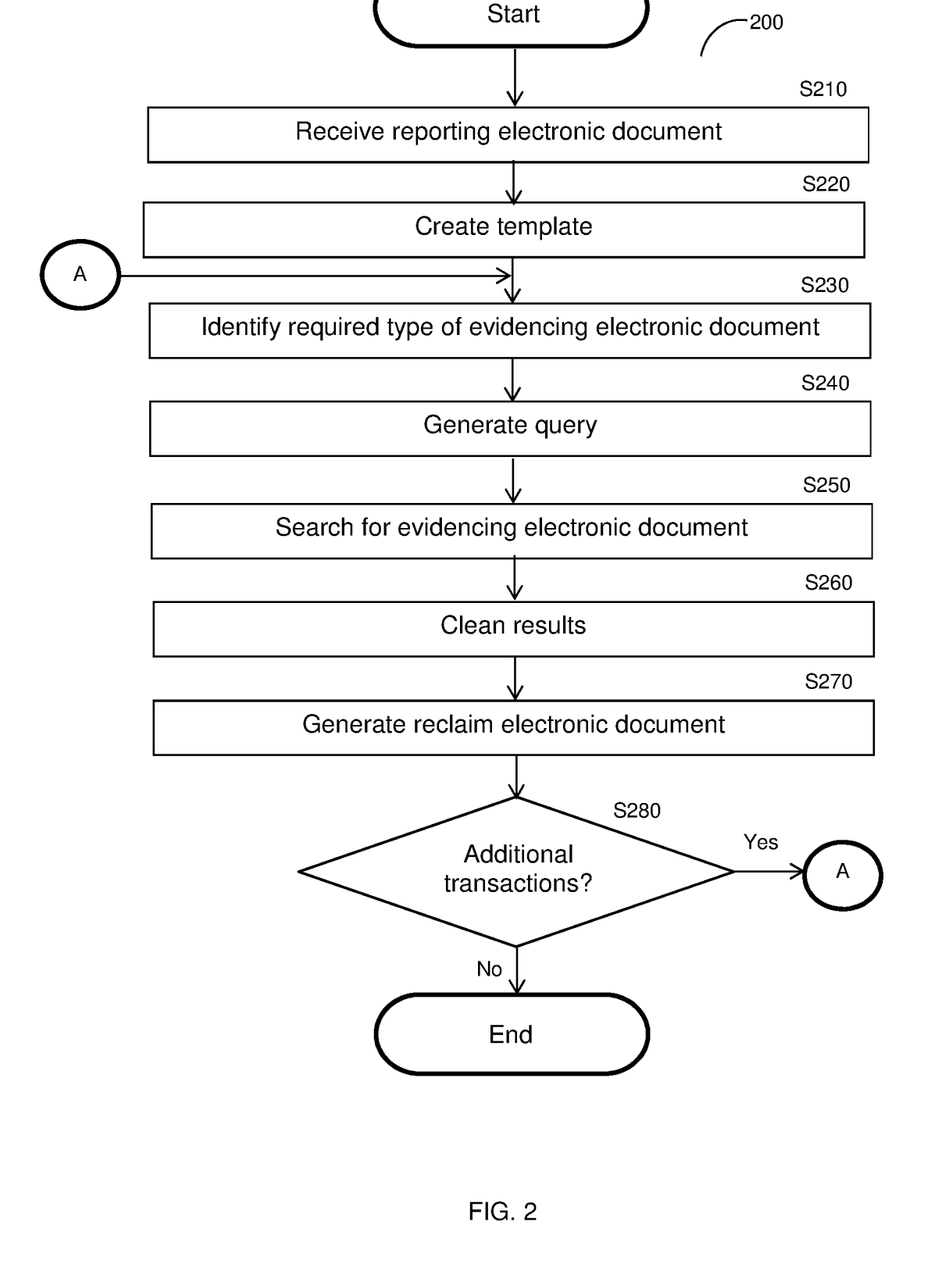
FIG. 2 is a flowchart illustrating a method for finding evidencing electronic documents based on unstructured data according to an embodiment.

FIG. 2 is an example flowchart 200 illustrating a method for finding evidencing electronic documents based on unstructured data according to an embodiment. In an embodiment, the method may be performed by a query generator (e.g., the query generator 120).

At S210, a first reporting electronic document is received or retrieved. The reporting electronic document includes at least partially unstructured data related to one or more transactions. The at least partially unstructured data includes, but is not limited to, unstructured data, semi-structured data, or structured data lacking a known format. The transaction electronic document may be retrieved from, for example, an enterprise resource planning (ERP) system (e.g., the enterprise system 130, FIG. 1), or may be received from, for example, a user device (e.g., the enterprise system 150, FIG. 1).

In some implementations, a request to generate a reclaim electronic document including the reporting electronic document or an identifier of the reporting electronic document may be received. The request may further indicate a type of reclaim (e.g., value-added tax or other tax, reimbursement for employee expenditures, etc.). Thus, in some implementations, S210 may include retrieving the reporting electronic document.

In an example implementation, the reporting electronic document may be an image showing, for example, one or more expense reports related to business activities. As a non-limiting example, the image may be captured by a mobile device operated by an employee of an organization who takes a picture of an expense report form.

At S220, a template is created for each transaction indicated in the reporting electronic document. In an embodiment, the transaction electronic document may be analyzed via an optical character recognition (OCR) processor. The analysis may further include using machine vision to identify elements in the at least partially unstructured data, cleaning or disambiguating the data, and generating a structured data including key fields and values identified in the at least partially unstructured data. As an example, for an image of a receipt, machine vision may be utilized to identify information related to a transaction noted in the receipt such as price, location, date, buyer, seller, and the like.

At optional S230, based on one of the created templates, a required type of evidencing electronic document is determined for the respective transaction. In an embodiment, S230 may also include identifying one or more data sources storing the required type of evidencing electronic document. The identified data sources may be queried to find a matching evidencing electronic document for the transaction.

At S240, a query is generated based on the created template. The query may be generated based further on the determined required type of evidencing electronic document. For example, the query may be generated based on typical identifying information of the required type of evidencing electronic document, based on query formats accepted by the identified data sources, or both. The query may be generated based on values in fields that uniquely identify the transaction. As a non-limiting example, for a template including the fields "date," "price," "quantity," and "item name" or "item number," a query indicating the values in those fields may be generated.

In an embodiment, S240 may include generating more than one query. More than one query may be utilized when, for example, data sources requiring different format queries are to be searched, to optimize queries for specific data sources, and the like. To this end, the generated query may be further based on optimization rules for optimizing queries for one or more data sources.

At S250, the generated queries are utilized to search in one or more data sources for an evidencing electronic document. In an embodiment, S250 includes querying one or more web sources using the generated queries. In a further embodiment, S250 may include first querying a database of an enterprise for an evidencing electronic document for the transaction, and only querying the web sources if the evidencing electronic document is not found in the database. In an embodiment, S250 may further include retrieving the found electronic document. In a further embodiment, S250 may include storing the found electronic document in, for example, a database (e.g., the database 140).

In some implementations, S250 may include generating a notification indicating the results of the search. The notification may include the evidencing electronic document for the transaction.

At optional S260, results of the search may be cleaned to remove private information, irrelevant information, or both. The cleaning may be based on cleaning rules.

At optional S270, a reclaim electronic document may be generated based on the created template and the result evidencing electronic document. In an example implementation, the reclaim electronic document may be a completed VAT reclaim request form including the result evidencing electronic document.

At S280, it is checked whether evidencing electronic documents for additional transactions are required and, if so, execution continues with S230; otherwise, execution terminates.

Figure 3:
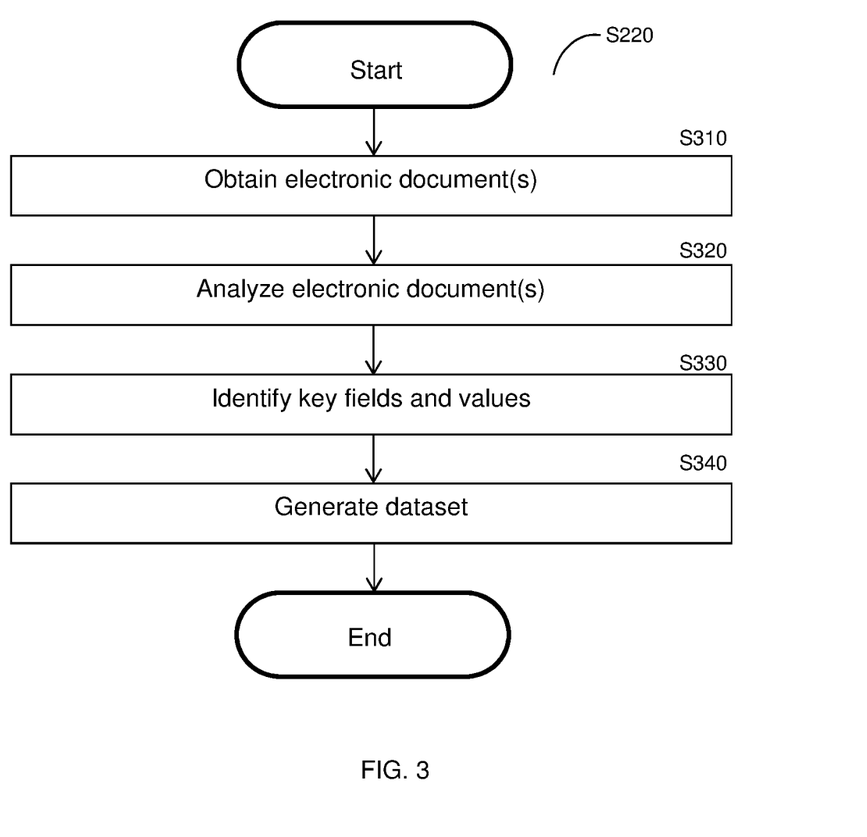
FIG. 3 is a flowchart illustrating a method for creating a template according to an embodiment.

FIG. 3 is an example flowchart S220 illustrating a method for creating a template based on an electronic document including at least partially unstructured data according to an embodiment.

At S310, the electronic document is obtained. Obtaining the electronic document may include, but is not limited to, receiving the electronic document (e.g., receiving a scanned image) or retrieving the electronic document (e.g., retrieving the electronic document from a consumer enterprise system, a merchant enterprise system, or a database).

At S320, the electronic document is analyzed to identify elements in the at least partially unstructured data. The analysis may include, but is not limited to, using optical character recognition (OCR) to determine characters in the electronic document.

The elements may include, but are not limited to, characters, strings, or both, related to a transaction. As a non-limiting example, the elements may include printed data appearing in an expense receipt related to a business activity. Such printed data may include, but is not limited to, date, time, quantity, name of seller, type of seller business, value added tax payment, type of product purchased, payment method registration numbers, and the like.

At S330, based on the analysis, key fields and values in the electronic document are identified. The key field may include, but are not limited to, merchant's name and address, date, currency, good or service sold, a transaction identifier, an invoice number, and so on. An electronic document may include unnecessary details that would not be considered to be key values. As an example, a logo of the merchant may not be required and, thus, is not a key value. In an embodiment, a list of key fields may be predefined, and pieces of data that may match the key fields are extracted. Then, a cleaning process is performed to ensure that the information is accurately presented. For example, if the OCR would result in a data presented as "1211212005", the cleaning process will convert this data to 12/12/2005. As another example, if a name is presented as "Mo$den", this will change to "Mosden". The cleaning process may be performed using external information resources, such as dictionaries, calendars, and the like.

In a further embodiment, it is checked if the extracted pieces of data are completed. For example, if the merchant name can be identified but its address is missing, then the key field for the merchant address is incomplete. An attempt to complete the missing key field values is performed. This attempt may include querying external systems and databases, correlation with previously analyzed invoices, or a combination thereof. Examples for external systems and databases may include business directories, Universal Product Code (UPC) databases, parcel delivery and tracking systems, and so on. In an embodiment, S430 results in a complete set of the predefined key fields and their respective values.

In another embodiment, S330 may further include disambiguating the unstructured data. The disambiguation may be based on, but not limited to, a file name of the unstructured data set, dictionaries, algorithms, thesauruses, and the like. Disambiguation may result in more accurate identification of the transactions. The disambiguation may be based on, but not limited to, the structure of the data (e.g., data in a field "Destination" may be disambiguated based on names of locations), dictionaries, algorithms, thesauruses, and the like. In some implementations, if disambiguation is unsuccessful, a notification may be generated and sent to a user (e.g., a user of the enterprise system 150), prompting the user to provide further clarification.

As a non-limiting example, for an image in a file titled "Purchase Receipt," a string "$300.00" character on the same line as the string "Total Price" may be utilized to determine that the value to be included in a "purchase price" field is $300.00. As another example, the string "Drance" may be disambiguated based on a dictionary to result in metadata indicating that a location associated with the unstructured data set is France. As yet another example, in a field related to the type of expense, the structured data for a field may be "Taxi in Paris" and value for the field may be "60 Euros". Based on one or more rules for maximum taxi price, it may be determined that the amount "60 Euros" is too high for a taxi expense and, therefore, that the field corresponds to multiple taxi trips.

At S340, a structured dataset is generated. The generated dataset includes the identified key fields and values.

FIG. 4 is an example schematic diagram of the query generator 120 according to an embodiment. The query generator 120 includes a processing circuitry 410 coupled to a memory 415, a storage 420, and a network interface 440. In an embodiment, the query generator 120 may include an optical character recognition (OCR) processor 430. In another embodiment, the components of the query generator 120 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 415 may be volatile (e.g., RAM, etc.), non-volatile (e.g., ROM, flash memory, etc.), or a combination thereof. In one configuration, computer readable instructions to implement one or more embodiments disclosed herein may be stored in the storage 420.

In another embodiment, the memory 415 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to search for evidencing electronic documents based on unstructured data, as discussed herein.

The storage 420 may be magnetic storage, optical storage, and the like, and may be realized, for example, as flash memory or other memory technology, CD-ROM, Digital Versatile Disks (DVDs), or any other medium which can be used to store the desired information.

The storage 420 may also store metadata generated based on analyses of unstructured data by the OCR processor 430. In a further embodiment, the storage 420 may further store queries generated based on the metadata.

The OCR processor 430 may include, but is not limited to, a feature and/or pattern recognition processor (RP) 435 configured to identify patterns, features, or both, in unstructured data sets. Specifically, in an embodiment, the OCR processor 430 is configured to identify at least characters in the unstructured data. The identified characters may be utilized to create a dataset including data required for verification of a request.

The network interface 440 allows the query generator 120 to communicate with the enterprise system 130, the database 140, the enterprise system 150, or a combination of, for the purpose of, for example, receiving electronic documents, sending notifications, searching for electronic documents, storing data, and the like.

It should be understood that the embodiments described herein are not limited to the specific architecture illustrated in FIG. 4, and other architectures may be equally used without departing from the scope of the disclosed embodiments.

It should be noted that various embodiments described herein are discussed with respect to searching for evidencing electronic documents matching a single transaction indicated in a reporting electronic document merely for simplicity purposes and without limitation on the disclosed embodiments. Evidencing electronic documents for multiple transactions indicated in a reporting electronic document may be found, in series or in parallel, without departing from the scope of the disclosure. As a non-limiting example, the reporting electronic document may be an expense report indicating multiple transactions made by an employee.

It should also be noted that various disclosed embodiments are discussed with respect to utilizing the evidencing electronic documents found based on unstructured data reporting electronic documents for VAT reclaims merely for example purposes and without limitation on the disclosure. The evidencing electronic documents may be equally utilized for other submissions such as, but not limited to, other types of reclaims, tax preparation, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for finding evidencing electronic documents based on unstructured data, comprising:
   analyzing a first electronic document to determine at least one transaction parameter of a transaction, wherein the first electronic document includes at least partially unstructured data;
   creating a template for the transaction, wherein the template is a structured dataset including the determined at least one transaction parameter;
   generating, based on the created template, at least one query; and
   querying at least one data source for a second electronic document using the at least one query, wherein the second electronic document is different from the first electronic document.

2. The method of claim 1, wherein determining the at least one transaction parameter further comprises:
   identifying, in the first electronic document, at least one key field and at least one value;
   creating, based on the first electronic document, a dataset, wherein the created dataset includes the at least one key field and the at least one value; and
   analyzing the created dataset, wherein the at least one transaction parameter is determined based on the analysis.

3. The method of claim 2, wherein identifying the at least one key field and the at least one value further comprises:
   analyzing the first electronic document to determine data in the first electronic document; and
   extracting, based on a predetermined list of key fields, at least a portion of the determined data, wherein the at least a portion of the determined data matches at least one key field of the predetermined list of key fields.

4. The method of claim 3, wherein analyzing the first electronic document further comprises:
   performing optical character recognition on the first electronic document.

5. The method of claim 2, wherein the at least one query is generated based on a value in each of at least one predetermined key field among the identified at least one key field.

6. The method of claim 1, further comprising:
   cleaning the second electronic document, wherein the cleaning includes removing, based on at least one cleaning rule, at least one of: private data, and irrelevant data.

7. The method of claim 1, further comprising:
   determining a required type of the second electronic document based on the created template, wherein the query is generated based further on the determined required type.

8. The method of claim 7, further comprising:
   identifying the at least one data source based on the determined required type.

9. The method of claim 1, further comprising:
   generating, based on the created template and the second electronic document, a third electronic document, wherein the third electronic document includes a request and the second electronic document.

10. A non-transitory computer readable medium having stored thereon instructions for causing one or more processing units to execute a process for verifying unstructured enterprise resource planning data, the process comprising:
    analyzing a first electronic document to determine at least one transaction parameter of a transaction, wherein the first electronic document includes at least partially unstructured data;
    creating a template for the transaction, wherein the template is a structured dataset including the determined at least one transaction parameter;
    generating, based on the created template, at least one query; and
    querying at least one data source for a second electronic document using the at least one query, wherein the second electronic document is different from the first electronic document.

11. A system for finding evidencing electronic documents based on unstructured data, comprising:

a processing circuitry; and a memory, the memory containing instructions that, when executed by the processing circuitry, configure the system to:

analyze a first electronic document to determine at least one transaction parameter of a transaction, wherein the first electronic document includes at least partially unstructured data;

create a template for the transaction, wherein the template is a structured dataset including the determined at least one transaction parameter;

generate, based on the created template, at least one query; and query at least one data source for a second electronic document using the at least one query, wherein the second electronic document is different from the first electronic document.

12. The system of claim 11, wherein the system is further configured to:

identify, in the first electronic document, at least one key field and at least one value;

create, based on the first electronic document, a dataset, wherein the created dataset includes the at least one key field and the at least one value; and analyze the created dataset, wherein the at least one transaction parameter is determined based on the analysis.

13. The system of claim 12, wherein the system is further configured to:

analyze the first electronic document to determine data in the first electronic document; and extract, based on a predetermined list of key fields, at least a portion of the determined data, wherein the at least a portion of the determined data matches at least one key field of the predetermined list of key fields.

14. The system of claim 13, wherein the system is further configured to:

perform optical character recognition on the first electronic document.

15. The system of claim 12, wherein the query is generated based on a value in each of at least one predetermined key field among the identified at least one key field.

16. The system of claim 11, wherein the system is further configured to:

clean the second electronic document, wherein the cleaning includes removing, based on at least one cleaning rule, at least one of: private data, and irrelevant data.

17. The system of claim 11, wherein the system is further configured to:

determine a required type of the second electronic document based on the created template, wherein the query is generated based further on the determined required type.

18. The system of claim 17, wherein the system is further configured to:

identify the at least one data source based on the determined required type.

19. The system of claim 11, wherein the system is further configured to:

generate, based on the created template and the second electronic document, a third electronic document, wherein the third electronic document includes a request and the second electronic document.

* * * * *